United States Patent [19]
Bookbinder et al.

[11] Patent Number: 5,389,325
[45] Date of Patent: Feb. 14, 1995

[54] ACTIVATED CARBON BODIES HAVING PHENOLIC RESIN BINDER

[75] Inventors: Dana C. Bookbinder; Evelyn M. DeLiso, both of Corning, N.Y.; Ronald E. Johnson, Tioga, Pa.; Kevin P. Streicher, Bath, N.Y.

[73] Assignee: Corning Incorporated, Corning, N.Y.

[21] Appl. No.: 125,776

[22] Filed: Sep. 24, 1993

[51] Int. Cl.$^6$ ............................................. B32B 3/12
[52] U.S. Cl. .................. 264/177.12; 428/116; 428/408
[58] Field of Search .............. 428/116, 118, 408; 264/29.7, 177.12

[56] References Cited

U.S. PATENT DOCUMENTS

| | | | |
|---|---|---|---|
| 3,634,569 | 1/1972 | Emanuelson et al. | 264/105 |
| 3,825,460 | 7/1974 | Yoshikawa et al. | 428/116 X |
| 3,922,412 | 11/1975 | Yoshikawa et al. | 428/118 |
| 4,399,052 | 8/1983 | Sugino | 428/116 X |
| 5,194,458 | 3/1993 | Tarquini | 428/403 X |

FOREIGN PATENT DOCUMENTS

| | | |
|---|---|---|
| 49-115110 | 11/1974 | Japan. |
| 55-167118 | 12/1980 | Japan. |
| 2235684 | 3/1991 | United Kingdom. |

Primary Examiner—Henry F. Epstein
Attorney, Agent, or Firm—L. Rita Quatrini

[57] ABSTRACT

A body made of carbon particles bonded together with a phenolic resin wherein the resin content is about 5% to about 35% by weight based on the total weight of carbon and resin.

A method for making the body involves forming an aqueous mixture composed of in percent based on the total weight of the activated carbon and phenolic resin about 5% to about 35% solid phenolic resin, about 4% to about 10% plasticizing organic binder which can be cellulose ethers, cellulose ether derivatives, and combinations thereof, and the balance of the mixture being activated carbon particles, forming the mixture into a body, and drying the formed body.

12 Claims, 1 Drawing Sheet

ACTIVATED CARBON BODIES HAVING PHENOLIC RESIN BINDER

This invention relates to carbon bodies which are made from mixtures containing a phenolic resin binder and to the method of making them. The bodies made by the method of the invention have either high strength or high adsorption capacity for gases and liquids at temperatures up to about 200° C., and water resistance.

BACKGROUND OF THE INVENTION

Activated carbon materials have found use in a variety of applications such as gas and liquid adsorption applications, for example radon testing, gas masks, sugar refining, municipal water treatment, removal of microbiological agents, adsorption of volatile organic compounds, separation of colloidal or dissolved organic substances, etc.

The predominant commercial use for activated carbon is in the form of granules. While activated carbon in the form of granules can perform the desired adsorption for many applications, there are some applications in which the granules have drawbacks. In some cases back pressure of a packed bed of granules is a problem. Some applications can result in considerable wear of the granules by attrition, causing loss of material or bed packing. Furthermore, the fines which are generated as a result of attrition can block the flow path.

Another approach is to use an extruded activated carbon in the form of a cellular structure such as a honeycomb. The honeycomb can readily be shaped by extruding fine powders of activated carbon with suitable binders. Such a shape allows for ease of flow of the gases through the honeycomb with little back pressure. Also, the geometry can be such as to allow easy access of the gases to all of the carbon for adsorption of the species to be removed. Also, since the honeycomb is a solid piece, there should be little or no wear or attrition of the carbon.

In order to form an activated carbon honeycomb by extrusion, the carbon must be in the form of a fine powder. This can then be mixed with a liquid such as water and suitable plasticizers and binders. This plasticized mixture is then extruded through a die into the honeycomb shape, and dried.

These bodies sometimes suffer from low strength both in the as-extruded state and in the as-dried state. They can also develop cracks during the drying procedure. This is especially evident in the larger bodies due to differential shrinkage which occurs because of loss of moisture between the outer surfaces and the interior of the body. Also, they suffer from lack of water resistance which results in their deterioration when exposed to water.

Clays and resins have been used as binders in carbon mixtures to impart strength to the carbon body formed therefrom.

U.S. Pat. Nos. 3,825,460, 3,922,412, and 4,399,052, GB patent application 2,235,684A, Japanese patent application publication 49-115110 (1974), and 55-167118 (1980) relate to various methods of making carbon bodies using phenolic binders. Some of these references teach adding resin before activating the carbon. This procedure is relatively complicated as it involves carbonization of the phenolic resin binder, thereby destroying its properties.

Japanese patent application publication No. 55-167118 (1980) relates to a manufacturing method of activated charcoal formed material having water soluble organic binder, powder shape thermosetting resin, and powder shape activated charcoal, which are kneaded with water, formed to the desired shape and then heat-treated for hardening.

U.S. Pat. No. 3,634,569 relates to a method of forming a high density graphite structure by preparing a slurry of a thermosetting phenolic resin binder with a liquid dispersant, drying the slurry to drive off the dispersant, distributing the graphite and resin in a mold and forming the structure under pressure at a temperature of up to about 400° F.

It is highly desirable therefore, to improve the strength of the extruded honeycomb both in the extruded state for further processing and handling and also after drying to improve performance. It is also desirable to improve the drying procedures so that the bodies are produced crack-free. Furthermore, it is desirable to produce such bodies which maintain their structural integrity when in contact with water.

The present invention provides such improved bodies and a method for making them.

SUMMARY OF THE INVENTION

In accordance with one aspect of the invention, there is provided a body made of carbon particles bonded together with a phenolic resin wherein the resin content is about 5% to about 35% by weight based on the total weight of carbon and resin.

In accordance with another aspect of the invention, there is provided a method for making the body involves forming an aqueous mixture composed of in percent based on the total weight of the activated carbon and phenolic resin about 5% to about 35% solid phenolic resin, about 4% to about 10% plasticizing organic binder which can be cellulose ethers, cellulose ether derivatives, and combinations thereof, and the balance of the mixture being activated carbon particles, forming the mixture into a body, and drying the formed body.

DETAILED DESCRIPTION OF THE INVENTION

Figure 1:
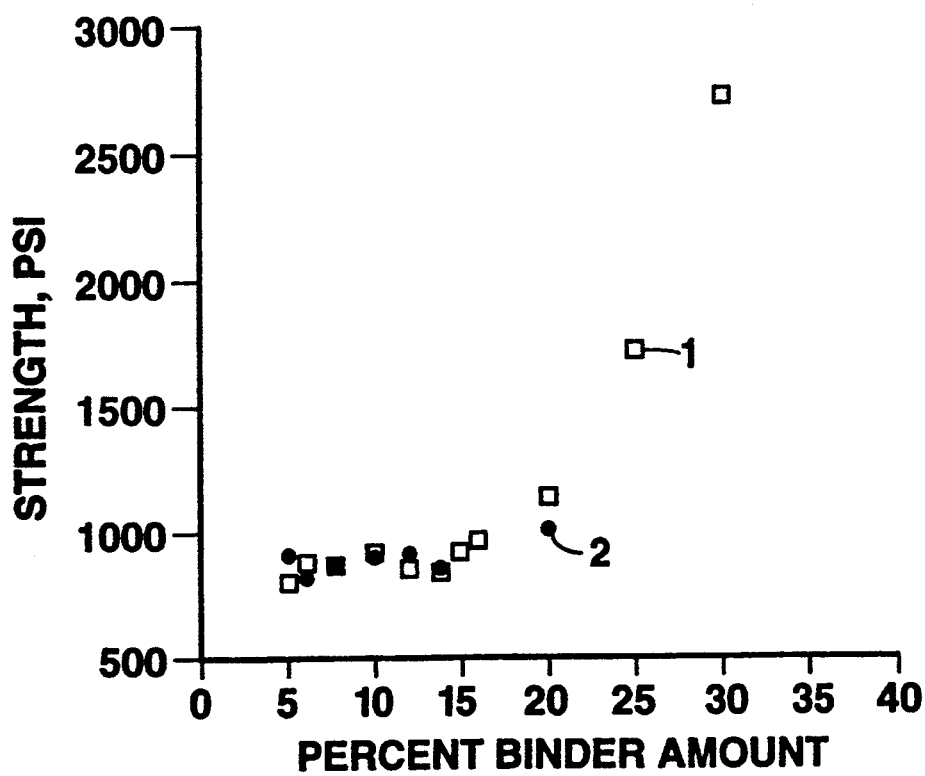
FIG. 1 is a plot of the resin content versus strength of bodies for two phenolic resins.

This invention relates to activated carbon bodies and method of making them.

The method involves forming the body from an aqueous mixture of activated carbon particles which contains organic binder of cellulose ether and/or cellulose ether derivative, and a phenolic resin binder. The mixture is formed into a body for example by extrusion, and dried.

As a result of the addition of resin according to the present invention, the bodies thus produced exhibit the characteristics of high strength at low temperatures, that is in the as-formed and as-dried state, up to temperatures of for example, about 200° C. They also exhibit high adsorption capacity, and water resistance. Furthermore, the bodies are produced crack-free.

The Type of Carbon

Activated carbon is a non-graphitic microcrystalline form of carbon which has been processed to produce a carbon with high porosity. The microcrystalline areas are made up of six-member carbon rings which are separated by areas of disorganized carbon. Activated carbon, typically has a high BET surface area in the range of about 450 to about 1800 $m^2/g$. There are various types of microporosity present in activated carbon. One classification scheme adopted by the International Union of Pure and Applied Chemistry classifies pores according to their width as follows: micropores which are less than about 2 nanometers, mesopores which are about 2 to about 50 nanometers, and macropores which are more than about 50 nanometers.

Activated carbon from any available source can be used, e.g., coconut shell, such as PCB-P from Calgon Carbon, Pittsburgh, Pa., wood based, such as Nuchar ® available from Westvaco, Chemical Division, Covington, Va., coal based such as Calgon BPL-F3, or it can be made from pyrolysis of organic compounds. An example of the latter is highly sulfonated styrene/divinylbenzene ion exchange resin, such as Ambersorb* available from Rohm and Haas, Philadelphia, Pa.

Depending on the application, the nature of the activated carbon can vary as far as particle size, surface area, adsorption capacity for hydrocarbons, adsorption efficiency, porosity, pore size, etc. The carbon can be a single type or a blend of types based on for example, precursor source, particle size, porosity, etc.

Preferably, the activated carbon powder is a fine powder wherein about 50% of the particles have a size of about 5 to about 40 micrometers in diameter as measured by Coulter Counter technique.

If the mixture is to be extruded into a honeycomb body, it is advantageous that the particles have an upper limit in size which is about one-half to about one-third the thickness of the honeycomb cell wall formed during extrusion. Some advantage may be achieved in terms of stiffening the batch rheology by blending different particle size distributions.

One source of activated carbon suitable for use in this invention is BPL-F3 activated carbon available from Calgon Carbon Corp. in several particle sizes and at different measurements of surface area. A particular preferred variety of activated carbon from this source is the "6×16" mesh size, which is available at a surface area of about 1050 to about 1300 $m^2/g$.

Especially suited to the practice of the present invention are activated carbon such as Calgon Carbon BPL-F3 which in the practice of the present invention is ground to an average particle size of about 5 to about 10 micrometers in diameter, and Nuchar SN-20 (a coarser powder available from Westvaco, having an average particle size of about 30 to about 40 micrometers in diameter as measured using the Coulter Counter technique.

The Phenolic Resin

Phenolic resins are condensation products of an aldehyde with a phenol source in the presence of an acidic or basic catalyst.

Phenol source according to the present invention means phenol itself and/or its derivatives, substituted phenols such as alkylated phenols, which are known in the art.

The aldehyde can be, for example, formaldehyde, acetaldehyde, paraldehyde, glyoxal, and furfuraldehyde, etc. The aldehyde is most typically formaldehyde.

Latent sources of curing agents and crosslinkers such as hexamethylenetetramine can be used in making the resin.

The phenolic resins can be modified to enhance certain properties. For example, they can be modified with suitable plasticizers, e.g. polyvinyl butyral, polyvinyl formal, alkyds, epoxy resins, phenoxy resins (bisphenol A, epichlorohydrin polymer) polyamides, oils, etc.

In epoxy-modified resins, commonly called epoxy-phenolics, the epoxy-phenolic ratio can be varied with the epoxy improving toughness as it is increased relative to the phenolic, hence the grade is referred to as epoxy-toughened. In epoxy-phenolics, the epoxy can be an adduct wherein the epoxy is partially pre-reacted with the phenolic, or it can be simply blended with the phenolic.

The phenolic resins used in the practice of the present invention are solid resins in powder form. For good dispersion of resin with carbon, it is advantageous that the resin powder be $-200$ mesh, (U.S. standard) although this is not necessary.

The phenolic resins used in the practice of the present invention are thermosetting in nature.

One way to characterize phenolic powders is by their flow characteristics. One way of measuring the flow properties of the phenolic resin is placing a sample of it on an inclined plate at about 125° C. and measuring the size of the patty that forms.

The flow conditions of the resin during processing are critical for obtaining the proper balance between strength and adsorption. If a resin has low flow characteristics, then it does not coat the carbon particles sufficiently to bond them together effectively. If the resin displays high flow characteristics, then it tends to fill up the microporosity in the carbon thereby taking away adsorption sites that are needed to achieve high adsorption capacity in the body. The resin must be able to flow sufficiently to bind the carbon particles together thus contributing strength to the body but not to block the porosity. To fulfill these requirements, the processing must link the flow characteristics of the resin to the time and temperatures used during drying. According to the practice of the present invention with the drying schedules used herein, a medium to high flowing resin gave the best results as far as strength and adsorption efficiency.

It is expected that by using alternate drying schedules, one would be able to use phenolic resins with a wide range of flow characteristics. For example, phenolic resins with a very high flow may tend to block the pores of the carbon before the resin has a chance to harden (cure). In this case, a faster temperature ramp can be used. The resin would cure faster and have less of a chance to block the carbon pores. The processing can also be modified in order to use low or very low flow resins.

It is a preferred practice of the present invention to use resin having medium-high flow characteristics when subjected to the drying procedures of the present invention.

The resin typically has a high cross linking density as known in the art. Cross-linking is achieved by heating the resin at about 150° to about 200° C. The network which results from cross-linking provides dimensional stability at elevated temperatures for extended periods of time.

A number of resins are available today that are suited for use in the practice of the present invention. Some of the resins which are commercially available today are given below, although the invention is not limited to these varieties.

Some suitable resins are supplied by Occidental Chemical Corporation, Durez Engineering Materials, Dallas, Tex. under the names of Varcum 29315 and 29320, (sometimes referred to as Durez 29315 and 29320 respectively).

Other suitable phenolic resins are supplied by Georgia Pacific Resins, Inc., Atlanta, Ga. under the names of PARAC ®. These resins are powdered phenolic resins which are thermosetting in nature and which cure permanently with heat. Examples of these types of resins are GP TM 5502 and 5520.

Other suitable resins are supplied by Plenco Industrial Resins Sheboygan, Wisconsin under the designations PLENCO 12204 and PLENCO 12211, the latter being an epoxy-modified resin.

The Plasticizing Organic Binder

The plasticizing organic binder contributes to the plasticity of the mixture for shaping into a body. The plasticizing organic binder according to the present invention refers to cellulose ether type binders and/or their derivatives some of which are thermally gellable. Some typical organic binders according to the present invention are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are typically used in the practice of the present invention. Methylcellulose, hydroxypropyl methylcellulose, and combinations thereof are especially preferred. Preferred sources of cellulose ethers and/or derivatives thereof, are Methocel• A4M and 20-333, F4 and F40 from Dow Chemical Co. Methocel• A4M is a methylcellulose binder having a gel temperature of 50°-55° C., and a gel strength of 5000 g/cm² (based on a 2% solution at 65° C.). Methocel• 20-333, F4, and F40 are hydroxypropyl methylcellulose.

The weight percent of resin is calculated as follows:

$$\frac{\text{wt. of resin}}{\text{wt. of activated carbon + resin}} \times 100$$

The weight percent of organic binder is calculated as a superaddition over the carbon and resin as follows:

$$\frac{\text{wt. of organic binder}}{\text{wt. of activated carbon + resin}} \times 100$$

The weight percent of water in the mixture is calculated as follows:

$$\frac{\text{wt. of water}}{\text{wt. of activated carbon + resin}} \times 100$$

An aqueous mixture is formed comprising in percent by weight about 4% to about 10% of the plasticizing organic binder, about 5% to about 35% phenolic resin, with the balance of the mixture being activated carbon particles.

More advantageously the organic binder content is about 4% to about 8%, and most advantageously about 5% to about 7% by weight for optimum plasticity and from an economic standpoint.

Depending on the properties desired in the product activated carbon body, the content of the phenolic resin can vary within the above range. For example, phenolic binder levels of $\geq 20\%$ (about 20% to 35%) are preferred for highest strength while levels of $\leq 20\%$ (about 5% to 20%) are preferred for highest adsorption capacity.

The mixture is formed by dry blending the solid components and then mixing with water. One technique of mixing, although it is to be understood that the invention is not limited to such is to place the dry blended components in a Muller mixer or other type of mixer such as a sigma blade or double arm mixer. While the solids are being mixed, water is added. Once the water is added, the Muller or other mixer is run until the batch compacts and becomes plasticized.

The water content in the mixture can be adjusted in order to impart optimum plasticity and handleability to the mixture. As the mixture is being mixed and water is being added, a point is reached at which the water is sufficient to wet all the particles. Continued mixing compacts the powder by removing air, and the compacted powder starts to agglomerate into lumps. Continued mixing results in these lumps becoming plastic. Excess water makes these lumps too soft for the forming process. Generally, the water content is about 100% to about 140%. The amount of water used decreases as the amount of phenolic resin increases.

In order to aid mixing, the batch can be pre-extruded one or several times such as by extruding through a multi-hole strand die to effect further mixing and to substantially homogenize the batch mixture.

Once the mixture is observed to be well plasticized, as indicated by hand or torque rheometer, it is formed into a body.

The bodies according to the present invention can have any convenient size and shape. For example, for hydrocarbon adsorption in engine exhaust purification, the preferred shape is a cellular body such as a honeycomb structure.

Some examples of honeycombs produced by the process of the present invention, although it is to be understood that the invention is not limited to these, are those having about 94 cells/cm² (about 600 cells/in²), about 62 cells/cm² (about 400 cells/in²), or about 47 cells/cm² (about 300 cells/in²), those having about 31 cells/cm² (about 200 cells/in²), or those having about 15 cells/cm² (about 100 cells/in²). Typical wall thicknesses in catalytic converter applications, can be, for example about 0.15 mm (about 6 mils) for about 62 cells/cm² (about 400 cells/in²) honeycombs. Wall (web) thicknesses range typically from about 0.1 to about 0.6 mm (about 4 to about 25 mils). The external size and shape of the body is controlled by the application and is not limited to those described above. For example, other combinations of cell densities and wall thicknesses can be made.

The forming can be done by any method that makes use of shaping a plasticized mixture. The preferred method of forming is by extrusion. A ram extruder is typically used, although any extrusion equipment known in the art can be used such as a continuous auger or twin screw extruder.

In forming honeycomb structures, it is preferred to extrude the mixture through a honeycomb die.

If desired, the formed body can be cut into parts of varying sizes.

The resulting formed body is then dried at temperatures not higher than about 125° C. to remove water. The drying conditions serve also to cure the resin. Because the bodies have a relatively high water content due mostly to the porosity of the carbon particles, care is taken to ensure that the bodies dry slowly and evenly so that they do not crack.

Carbon bodies made with organic binder alone, have to be dried very slowly to ensure against cracking. One advantage of the present invention is that the phenolic binder allows for a faster drying rate without the body cracking.

Several drying procedures can be employed and the choice of procedure depends largely on the size of the bodies being dried. For example, small bodies, that is, bodies which have at least one dimension which is no greater than about 2.54 cm (1″) can be dried by wrapping the bodies in aluminum foil and placing in a dryer set at no higher than about 100° C., typically at about 95° C. for a sufficient time to remove the water. The foil creates a humid environment so that the extruded body dries slowly and uniformly thus preventing cracking. Drying time can vary depending on the size of the body. For example, for a 2.54 cm (1″) diameter, 22.9 cm (9″) long honeycomb, the drying time is typically about 4 days.

Drying of large size crack-free activated carbon bodies containing more than about 100% water in the green state is difficult. Large size bodies according to the present invention are those having all dimensions greater than about 2.54 cm. For example, with honeycombs, initially, surface drying is so rapid that the bodies crack within about 10 minutes when left at ambient conditions. When water is removed from the surface by rapid drying, an outer ring of dried honeycomb shrinks more than the center of the honeycomb which is still moist. Thus, the mechanism for cracking is differential shrinkage between the outer ring of dried honeycomb and the interior which still contains a high level of moisture.

The problem of differential shrinkage causing cracking can solved by using controlled humidity drying which accomplishes the uniform transfer of moisture from the center of the honeycomb outward. The initial portion of a controlled humidity drying schedule maintains the humidity at high levels of for example >90% relative humidity. Controlled humidity drying schedules are used for drying activated carbon honeycombs made by the manner of this invention in sizes greater than about 5.08 cm (about 2″) in diameter.

Controlled humidity drying can be used also for small bodies.

In accordance with a preferred embodiment, the controlled humidity drying is done as follows.

(1) The temperature of the as-formed body is raised to a first temperature of no greater than about 90° C., preferably about 60° C. to about 90° C., without allowing the body to lose moisture. This step is done typically in a high humidity atmosphere (relative humidity of greater than about 90%) and mainly to prevent surface evaporation from the body.

(2) While the body is at the first temperature, moisture is slowly removed from the body until it has about 45% to about 65% by weight moisture remaining. This step is done typically in a high humidity atmosphere. Slow removal of moisture is necessary to prevent cracking.

(3) While the body is at the first temperature, the humidity to which the body is exposed is lowered for the purpose of increasing the rate of moisture removal. This is done to drop the moisture content in the body to no less than about 20% by weight of the starting moisture content, and typically about 20% to about 30%.

(4) Finally, the body is heated at a second temperature of at least about 90° C. to cure the resin while maintaining the humidity to which the body is exposed so that the moisture content in the body does not drop below about 10% by weight of the starting moisture content.

Advantageously, the above described drying procedure is carried out as follows.

Step (1) is carried out by placing the body to be dried in a humidity controlled atmosphere set to a first humidity level of about 92% to about 98% relative humidity and at a first temperature of about 60° C. to about 90° C. The body is allowed to remain in this controlled atmosphere until it reaches the first temperature, without losing moisture.

Step (2) is then carried out by removing an amount of moisture from the body equal to about 0.5 to about 1.5% by weight of the starting moisture content of the body per hour, until the moisture content of the body is about 45% to about 65% by weight of the starting moisture content. Typically, the relative humidity is maintained at the first relative humidity level.

Step (3) is then carried out by lowering the relative humidity in the atmosphere to a second relative humidity of about 40% to about 65%.

Finally in step (4), the heating is done at a second temperature of about 90° C. to about 98° C. while maintaining the second relative humidity level.

One especially preferred procedure for carrying out controlled humidity drying is as follows.

(1) The body is placed in an enclosed atmosphere such as in a controlled humidity dryer such as Model No. PLA-3GP, manufactured by Espec Corp. in Grand Rapids, Mich. Initially the body is in a sealed container that is impervious to water or moisture but will transfer heat, such as for example, a glass container or tube. Heat is applied to the body to a temperature of about 60° C. to about 90° C. The relative humidity is controlled to about 92% to about 98%. Sufficient time is allowed for the heating so that as the heat is transferred to the body, the temperature on the inside of the body is the same as on the outside or in other words the temperature is uniform throughout the body. For example with a honeycomb measuring about 7 cm (about 2.75″) in diameter and about 17.8 cm (about 7″) long and having about 31 cells/cm$^2$(200 cells/in$^2$), and a wall thickness of about 0.3 mm (12 mil), there is no loss of weight initially over about the first 5½ hours.

(2) The container is removed and the body is allowed to remain at about the same temperature and humidity as in (1) above for whatever time is necessary to remove moisture until it has a moisture content of about 45% to about 65% by weight of the starting moisture content.

Steps (3) and (4) are then carried out by setting the appropriate humidity and temperature control.

One advantage of the present invention is shown in comparison of drying time for 7 cm diameter 17.8 cm long honeycombs of the present invention versus the drying time of the same size honeycombs having polyvinyl alcohol (PVA) binder. In order to be produced crack-free, the PVA-containing honeycombs had to be dried by raising the temperature from 30° C. to about 60° C. over a 32 hour period with a total drying time of 200 hours. The bodies of the present invention, dried at about 80° C. in half the time in about 100 hours, showed no cracking.

The bodies of the present invention are characterized by discrete carbon particles bonded together with the resin binder but at the same time the adsorption sites (porosity) of the carbon are not blocked by the resin. They have high strength at temperatures of up to about 200° C. and high adsorption capacity for hydrocarbons for example, as evidenced by the adsorption capacity in butane adsorption tests.

To more fully illustrate the invention, the following non-limiting examples are presented. All parts, portions, and percentages are on a weight basis unless otherwise stated.

EXAMPLE 1 (DRYING OF LARGE HONEYCOMBS)

A mixture of about 20% GP TM 5502 resin and about 80% activated carbon and about 6% superaddition of Methocel 20-333 was made up, extruded into honeycombs and dried. The honeycombs measured about 7 cm, (2.75") in diameter, and 17.8 cm (7") in length, and had 31 cells/cm2 (200 cells/in$^2$), and a wall thickness of about 0.3 mm (12 mil). The water content which was required to extrude the mixture was about 126%. The initial mass of a honeycomb part after extrusion with a water content of about 126% was about 147 g of carbon and binders and about 185 g of water for a total of about 333 g. After extrusion, the honeycombs were immediately placed in a glass tubes with an inner diameter of about 7.6 cm (3"), which is slightly larger than the honeycomb itself. The honeycombs were placed in a controlled humidity dryer, Model No. PLA-3GP, manufactured by Espec Corp. in Grand Rapids, Mich. at about 80° C. and about 95% relative humidity. The samples were held at about 80° C. and about 95% relative humidity for about 5.5 hours with the honeycomb inside a glass tube and an additional 40 hours at the same temperature and humidity after the glass tube was removed. At this point, about 73 g of the water have been removed from the sample and about 61% of the initial water is remaining. The relative humidity was then lowered to 60% and the temperature maintained at about 80° C. for about 48 hours. The next step in the drying schedule was to ramp the temperature to about 95° C. at about 50% relative humidity. At the end of this drying schedule a honeycomb part weighed about 170 g and had about 12% moisture remaining in the honeycomb. The axial crushing strength of the honeycombs measured on 2.54 cm×2.54 cm (1"×1") cubes was about 290 psi.

EXAMPLE 2 (USE OF LOW FLOW PHENOLIC RESIN)

Honeycombs measuring about 2.54 cm (1") in diameter and having about 31 cells/cm$^2$ (200 cells/in$^2$), and a wall thickness of about 0.4 mm (15 mil) were extruded and dried. The resin was 20% PLENCO 12204, a low flow phenolic resin powder, and about 80% activated carbon with a 6% superaddition of Methocel 20-333. The crushing strength was about 612 psi and the butane adsorption capacity was about 39.82 mg/g of sample.

EXAMPLE 3 (USE OF MEDIUM FLOW RESIN)

Honeycombs having the same dimensions as in Example 2 were extruded and dried. The resin was 5% PLENCO 12211, a medium flow epoxy toughened phenolic resin powder, and about 95% activated carbon with a 6% superaddition of Methocel 20-333. The crushing strength was about 409 psi and the butane adsorption capacity was about 55.8 mg/g of sample.

EXAMPLE 4 (USE OF A HIGH FLOW PHENOLIC RESIN)

Honeycombs having the same dimensions as in Example 2 were extruded and dried. The resin was 20% Durez 29320, a high flow phenolic resin powder, and about 80% activated carbon with about a 6% superaddition of Methocel• 20-333. The crushing strength was about 516 psi and the butane adsorption capacity was about 31 mg/g of sample.

EXAMPLE 5 (WATER DURABILITY)

A honeycomb measuring about 7.6 cm (3") in length and having about 31 cells/cm$^2$ (200 cells/in$^2$), a wall thickness of about 0.4 mm (15 mil), and a composition of about 20% GP5502 and about 80% activated carbon with a 6% superaddition of Methocel• 20-333 was placed in water. After about 34 days, the honeycomb sample was strong and intact. A honeycomb of the same size and geometry but made from a composition of about 1.96% polyvinyl alcohol (PVA) (Airvol 205S from Air Products), about 98.04% activated carbon with a superaddition of about 6% Methocel 20-333 was also placed in water. After 7 days, the polyvinyl alcohol containing honeycomb was soft and spongelike. This example shows the better performance for water durability of the phenolic resin binder containing sample over the PVA containing sample.

EXAMPLE 6

Activated carbon mixtures were made up having the compositions given in Table 1. The resins used were Durez 29315 (resin 1) and GP 5502 (resin 2). The activated carbon was a mixture of about 80% Calgon Carbon BPL-F3 and about 20% Nuchar ® SN-20 with about a 6% superaddition of Methocel• 20-333.

TABLE 1

| Adsorption No. | % Resin | % Water | Strength Psi (Dried Only) | Mg/g |
|---|---|---|---|---|
| 1 | 5 | 136 | 816 | 53.9 |
| 2 | 6 | 135 | 875 | 48.1 |
| 3 | 8 | 133 | 866 | 48.2 |
| ·4 | 10 | 131 | 929 | 47.4 |
| 5 | 12 | 125 | 865 | 45.5 |
| 6 | 14 | 124 | 849 | 42.4 |
| 7 | 20 | 115 | 1155 | 34.1 |
| 8 | 15 | 128 | 935 | 43.0 |
| 9 | 16 | 123 | 971 | 43.3 |
| 10 | 25 | 111 | 1722 | 28.0 |
| 11 | 30 | 108 | 2684 | 21.0 |
| 12 | 5 | 134 | 927 | 53.5 |
| 13 | 6 | 131 | 825 | 52.8 |
| 14 | 8 | 131 | 871 | 51.2 |
| 15 | 10 | 130 | 902 | 49.0 |
| 16 | 12 | 128 | 913 | 45.4 |
| 17 | 14 | 124 | 859 | 42.6 |

TABLE 1-continued

| Adsorption No. | % Resin | % Water | Strength Psi (Dried Only) | Mg/g |
|---|---|---|---|---|
| 18 | 20 | 116 | 1013 | 34.1 |

Nos. 1–11 Durez 29315
Nos. 12–18 GP 5502

Each mixture was formed by dry blending the dry constituents and thereafter adding water to form a plasticized batch. The plasticized mixtures were extruded in a ram extruder into 2.54 cm (1") diameter 22.9 cm (9") long honeycombs having 31 cells/cm² (200 cells/in²) and wall thicknesses of about 0.4 mm (about 15 mil). Several honeycombs were made from each composition.

Honeycomb samples of about 1.27 cm (about ½") long were cut for hydrocarbon adsorption testing and about 2.54 cm (about 1") for strength measurements.

Crushing strengths are measured in a compression tester made by Tinius Olsen at a cross head rate of about 2.54 mm (about 0.1")/min. Each sample number reported is an average of measurements on six different pieces. Strengths were measured at room temperature on the samples as-dried.

Butane adsorption capacity was measured by placing test samples in a Vycor® tube housed inside a tube furnace having inlet and outlet ports. A 1500 volume ppm butane gas stream in a nitrogen carrier gas was introduced to the sample at a flow rate of about 4,000 cc/min. and adsorption was measured by monitoring the exit gas stream with a flame ionization detector. Adsorption at room temperature was considered complete when the calibrated detector reading had reached about 95%. At this time, the inlet gas stream was changed to nitrogen and desorption of the butane at room temperature was measured. When the detector reading reached a value of about 5%, the temperature of the sample was raised to about 100° C. by increasing the furnace temperature to remove the rest of the butane adsorbed on the sample. The detector readings were plotted versus time and the adsorption and desorption were measured by integrating the area of each curve. The values reported for adsorption are the milligrams of butane adsorbed divided by the sample mass after testing.

Figure 2:
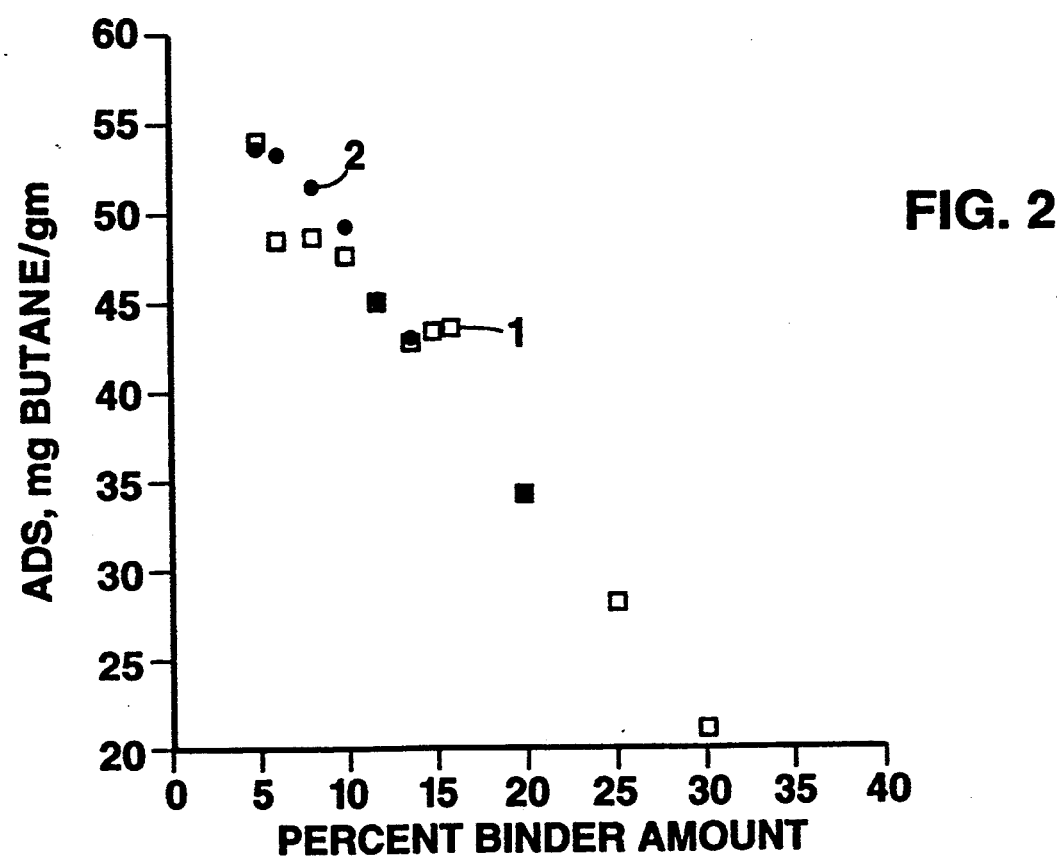
FIG. 2 is a plot of the resin content versus butane adsorbed for bodies produced from the same mixtures as those in FIG. 1.

The strength and adsorption values are given in the table and are plotted in FIGS. 1 and 2 respectively versus amount of resin. The strength and adsorption results show that there is a trade-off between strength and adsorption with the adsorption decreasing linearly with the increase in the amount of resin binder and with the strength increasing significantly above about 20% resin. Therefore, the level of resin can be chosen depending on the requirements of the application. For example, in applications in which strength is critical, the amount of resin can be higher. In applications in which adsorption is critical, the lower resin values can be chosen.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for making a carbon body having a phenolic resin binder, said method comprising:

a) forming an aqueous mixture comprising in percent based on the total weight of the activated carbon and phenolic resin,
      about 5% to about 35% solid phenolic resin,
      about 4% to about 10% plasticizing organic binder selected from the group consisting of cellulose ethers, cellulose ether derivatives, and combinations thereof,
      and the balance of the mixture being activated carbon particles;
   b) forming said mixture into a body; and
   c) drying the formed body.

2. A method of claim 1 wherein about 50% of the activated carbon particles have an average particle size of about 5 to about 40 micrometers in diameter as measured by Coulter Counter technique.

3. A method of claim 1 wherein the resin is phenol formaldehyde resin.

4. A method of claim 1 wherein said organic binder is selected from the group consisting of methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof.

5. A method of claim 4 wherein the organic binder is selected from the group consisting of methylcellulose, hydroxypropyl methylcellulose, and combinations thereof.

6. A method of claim 1 wherein the organic binder content is about 4% to about 8% by weight.

7. A method of claim 6 wherein the organic binder content is about 5% to about 7% by weight.

8. A method of claim 1 wherein the forming is done by extruding the mixture.

9. A method of claim 1 wherein the body is formed into a honeycomb structure.

10. A method of claim 1 wherein the drying is done according to a procedure comprising the steps of:
    i) raising the temperature of the as-formed body to a first temperature of no greater than about 90° C. without allowing the body to lose moisture,
    ii) while the body is at said first temperature, slowly removing moisture from the body until the body has a moisture content of about 45% to about 65% by weight remaining moisture,
    iii) while the body is at said first temperature, lowering the humidity to which the body is exposed to increase the rate of moisture removal to drop the moisture content in the body to no less than about 20% by weight of the starting moisture content, and
    iv) curing the resin in the body at a temperature of at least about 90° C. while maintaining the humidity to which the body is exposed so that the moisture content in the body does not drop below about 10% by weight of the starting moisture content.

11. A method of claim 10 wherein
    step i is carried out by placing the as-formed body in a humidity-controlled atmosphere at a first relative humidity of about 92% to about 98% and a first temperature of about 60° C. to about 90° C. and allowing the body to remain at said first relative humidity for a period of time sufficient to allow the body to reach said first temperature without losing a significant amount of its starting moisture content;

step ii is carried out by removing an amount of moisture from said body equal to about 0.5 to about 1.5% by weight of the starting moisture content of said body per hour, until the moisture content of said body is about 45% to about 65% by weight of said starting moisture content, step iii is carried out by lowering the relative humidity in said atmosphere to a second relative humidity of about 40% to about 65%, and step iv is carried out by curing the resin in the body at a temperature of about 90° C. to about 98° C. at the second relative humidity level.

12. A method for making a carbon body having a phenolic resin binder, said method comprising:
   a) forming an aqueous mixture comprising in percent based on the total weight of the activated carbon and phenolic resin,
      about 5% to about 35% solid phenolic resin,
      about 4% to about 10% plasticizing organic binder selected from the group consisting of cellulose ethers, cellulose ether derivatives, and combinations thereof,
      and the balance of the mixture being activated carbon particles;
   b) forming said mixture into a body; and
   c) drying the formed body wherein the drying is done by
      i) raising the temperature of the as-formed body to a first temperature of no greater than about 90° C. without allowing the body to lose moisture,
      ii) while the body is at said first temperature, slowly removing moisture from the body until the body has a moisture content of about 45% to about 65% by weight remaining moisture,
      iii) while the body is at said first temperature, lowering the humidity to which the body is exposed to increase the rate of moisture removal to drop the moisture content in the body to no less than about 20% by weight of the starting moisture content, and
      iv) curing the resin in the body at a temperature of at least about 90° C. while maintaining the humidity to which the body is exposed so that the moisture content in the body does not drop below about 10% by weight of the starting moisture content.

* * * * *